Figure 1:
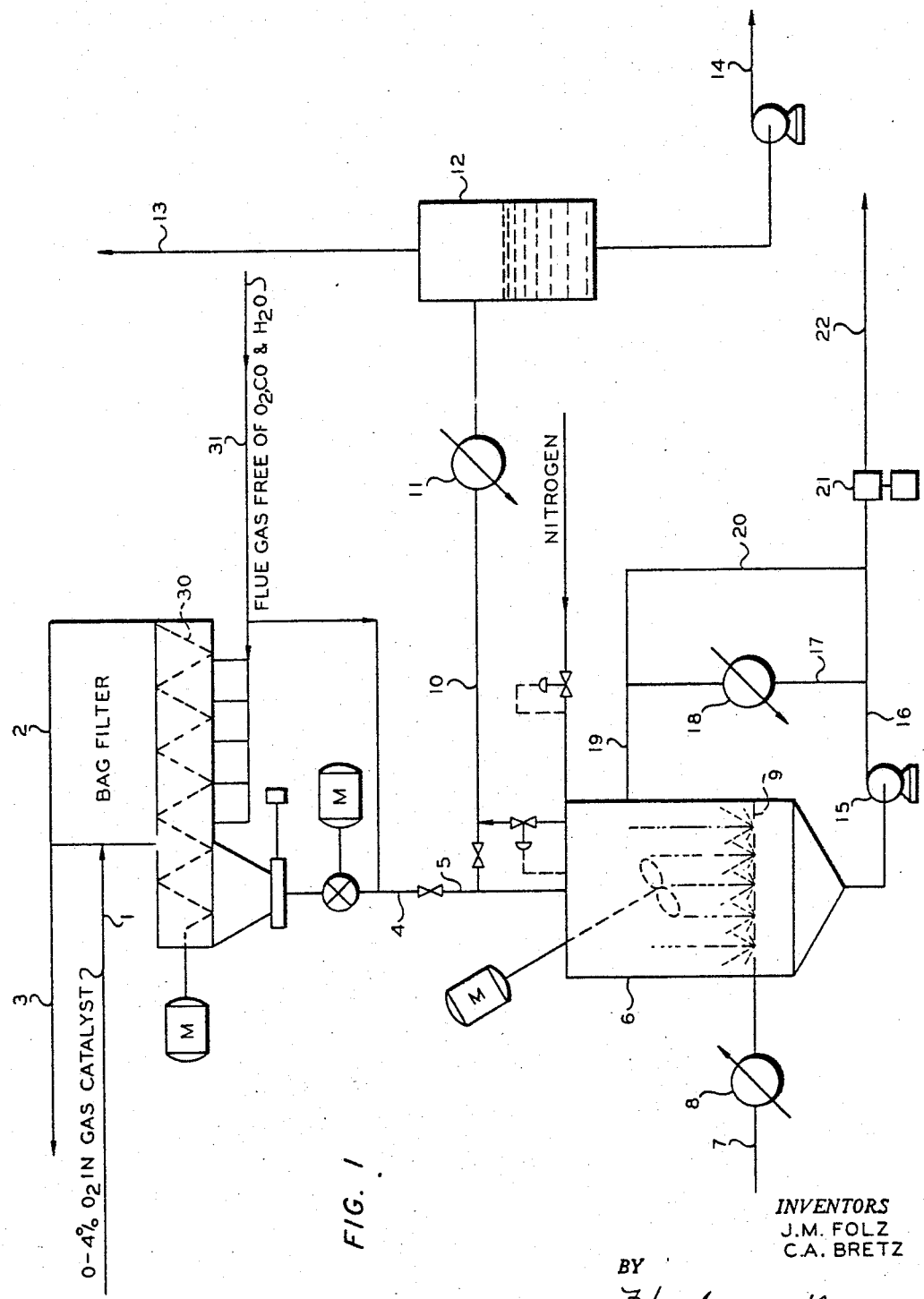

INVENTORS
J.M. FOLZ
C.A. BRETZ

BY Hudson & Young
ATTORNEYS

United States Patent Office 2,963,525
Patented Dec. 6, 1960

2,963,525
METHOD OF SUPPLYING A CATALYST TO A REACTOR AND APPARATUS THEREFOR

John M. Folz and Carl A. Bretz, Bartlesville, Okla., assignors to Phillips Petroleum Company, a corporation of Delaware Filed May 7, 1956, Ser. No. 582,971

15 Claims. (Cl. 260—683.15)

This invention relates to a method for supplying a catalyst slurry to a reactor. In one aspect of the invention, it relates to a method for supplying a slurry of a catalyst to a reactor by circulating said slurry at a rate to maintain the same in turbulent condition in a circulating system, for example, a loop, and feeding a relatively small proportion of said slurry from said system to said reactor. In another of its aspects, the invention relates to a method for supplying a slurry of chromia-silica-alumina catalyst, in a manner as described herein, to a reactor in which olefins are polymerized.

In processes in which catalyst slurries are employed or in which catalysts are introduced into a reaction zone wherein the catalysts are ultimately present and employed in the form of a slurry, there is presented quite often the problem of supplying the catalyst to the reactor efficiently and economically without contamination by air, water vapor or other contaminants. The problem is especially intensified whenever the catalyst is obtained in useful form at a relatively low pressure but is employed at a relatively high pressure.

In those processes in which a powdered catalyst is available and is introduced by various means into a reactor or reaction zone in which the catalyst is ultimately employed as a slurry, it will be clear to one skilled in the art in possession of this disclosure that some of the fluid resulting in said slurry can be priorly admixed with the catalyst powder to form a slurry. The invention will now be described in connection with an invention or process in which catalyst is added to a polymerization zone in which olefins are polymerized at a pressure which ordinarily is higher than atmospheric.

In a process for the polymerization of olefins, for example, ethylene, such as have been presented, described and claimed elsewhere, in the presence of a finely divided solid chromia-silica-alumina catalyst, the catalyst is added to the polymerization zone in relatively small amounts compared to the total weight of materials added to the reaction zone. The quantity of catalyst used is generally in the range of 0.1 to 0.5 weight percent of the reactor contents and 90–95 weight percent of the catalyst is generally in the 18–100 mesh size range. A specific catalyst which is used in the production of a polyethylene contains 90 percent silica, 8 percent aluminum oxide and 2 percent hexavalent chromium oxide. This catalyst is more fully described and claimed elsewhere. The catalyst is first treated with dry air at 950–1150° F. for a period of 25–35 hours. This treatment dehydrates the catalyst. It is advantageous to feed this catalyst to the reactor as a slurry in the polymerization solvent. The physical size of the equipment necessary precludes the possibility of employing gravity flow to a star valve or similar solids feeder. The reactor is operated at pressures in the range of atmospheric to 700 p.s.i. or higher and this would necessitate building the hopper, which feeds the star valve, to withstand these pressures. The use of a large pressure vessel supported above a reactor, in order to obtain gravity flow, is obviously not desirable. It is necessary to provide a large storage for catalyst to be used to eliminate repeated recharging of the storage vessel with consequent exposure of the catalyst to water vapor and to provide a relatively long operating period with a uniform batch of catalyst.

We have provided a method for supplying this catalyst in the form of a slurry to the reactor whereby the foregoing disadvantages are eliminated. This method permits the storage of a relatively large supply of catalyst which will permit the reactor to be operated at stable conditions with respect to catalyst variation. This system provides a catalyst storage at pressures of 1–3 p.s.i. as opposed to pressures as high a 700 p.s.i. The design and operation of the vessels are thereby simplified.

An object of this invention is to provide a method for supplying a catalyst to a reaction zone or reactor. Another object of this invention is a method for supplying a catalyst in the form of a slurry to a reaction zone which is at a pressure above that at which the catalyst slurry is obtained. A further object of this invention is the provision of a method for supplying a catalyst in the form of slurry out of contact with air or other contaminating substance to a reaction zone or reactor in which the said catalyst is employed to effect a reaction to which zone the catalyst is supplied as a minor proportion of the total mass therein and to which the said catalyst must be supplied in a readily dispersible form. A further object still is the provision of a method of supplying catalyst slurry to a reactor or reaction zone in continuous manner whether or not said slurry is prepared continuously or periodically.

Other aspects, objects as well as the several advantages of this invention will be apparent to one skilled in the art who has studied this disclosure, the drawings, and the appended claims.

According to this invention, a method for supplying a catalyst to a reaction zone in subdivided form and as a slurry has been provided wherein the catalyst slurry when prepared is circulated in a circulating system or loop from which a small size stream is taken at pressure near atmospheric and moved by a fluid moving means to the relatively higher pressure in the reaction zone. The fluid moving means can be any means which is capable of supplying the slurry from the circulating loop or suspension system to the reaction zone. A positive displacement pump is well suited and is now a preferred means for moving the slurry to the reaction zone.

It will be noted that a positive displacement pump can be used accurately to meter catalyst slurry or suspension into the reaction zone. The total amount of slurry being fed at any given time can be controlled by controlling the stroke setting of the positive displacement pump or pumps and changes in feed rate can be made manually or automatic controls employed. When automatic controls are employed, these are related to a process variable.

Also, according to the present invention, a method for supplying slurry in continuous manner or batch-wise, as desired, or by a combination of both types of operation has been provided, as described hereinbelow.

Figure 2:
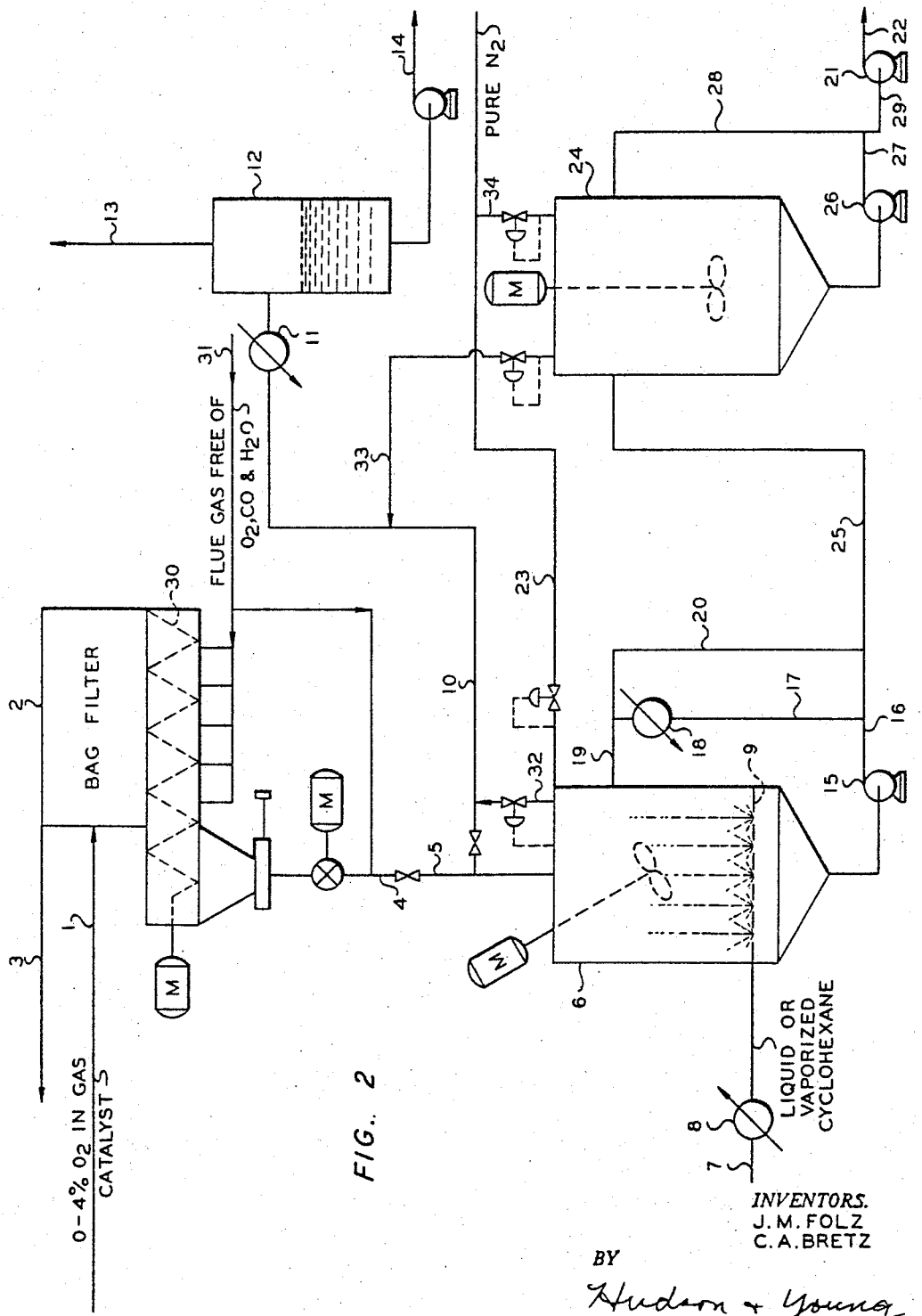
Figure 3:
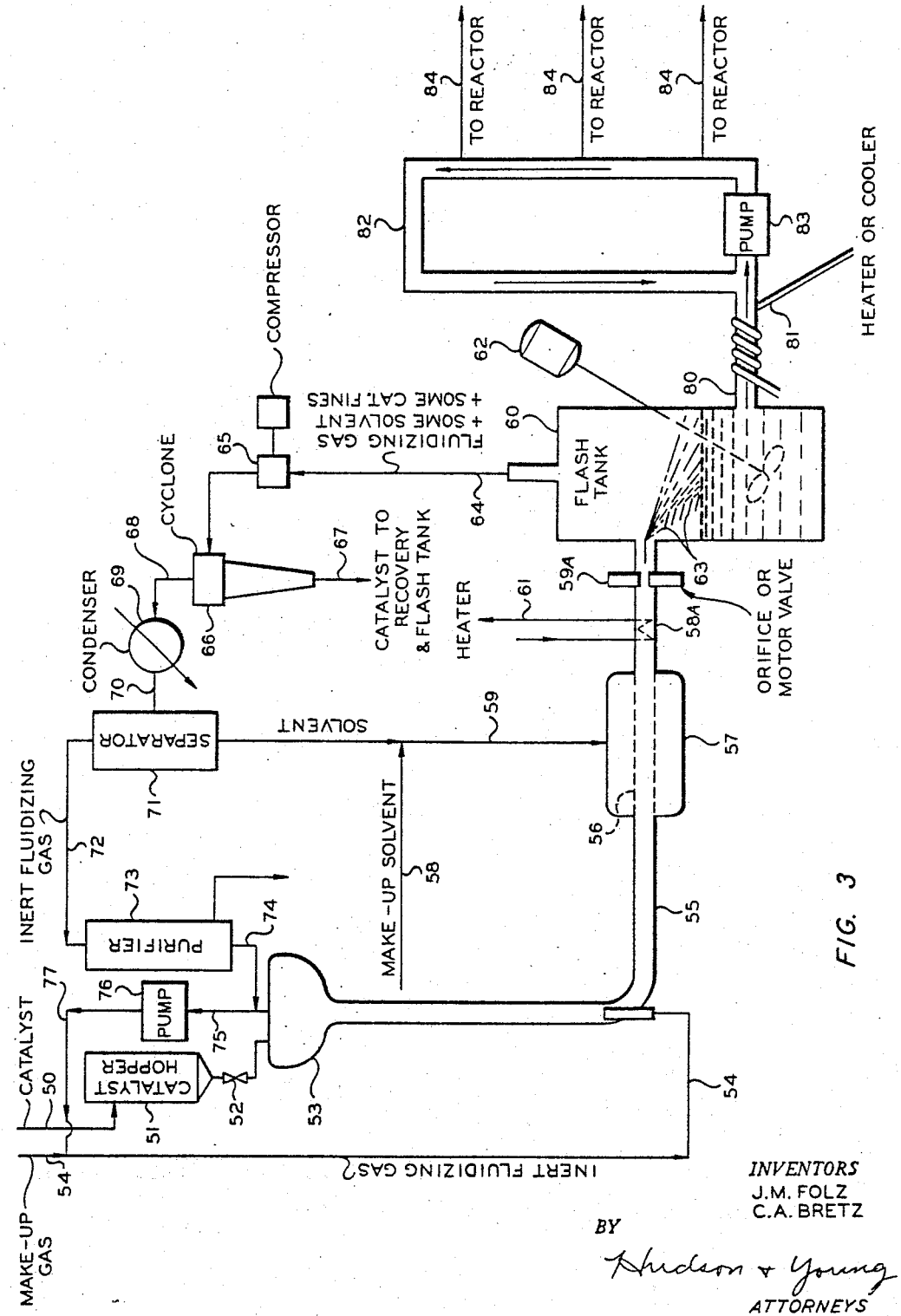

Referring to the drawings, Figure 1 shows, schematically, one form of operation in which catalyst is prepared batch-wise, circulated in a closed system or loop, which can be provided with temperature adjusting means, and then pumped to one or more reactors not shown. Figure 2 shows a variation of the operation of Figure 1 and differs from Figure 1 at least in that means later described are provided wherein to effectuate steps providing for continuous operation or feed of prepared slurry. Figure 3 shows another continuous operation.

Figure 1 will now be described in connection with a specific example of the operation of the system of the invention by reference to a commercial operation for producing 15,220 pounds per 24 hour day of polyethylene by the polymerization of ethylene in the presence of a chromia-silica-alumina catalyst. After activation of the catalyst in a suitable activator, not shown, the catalyst is transported by suitable means to the catalyst slurry mix tank. The catalyst is transported by a flow of a dry flue gas containing less than about 4 percent oxygen through conduit 1 to a bag filter 2. The inert gas is removed via conduit 3, at which point an oxygen analysis is made, and can be recycled. Bag filter 2 is at all times maintained under a positive pressure of the flue gas. The gas transport media must be dry since water vapor is a catalyst poison which is difficult to remove. An inert flue gas substantially free of oxygen, carbon monoxide and moisture is introduced into the catalyst line 5 and the conveyor 30 from line 31. This purge gas strips any oxygen from the catalyst which may have been present in the carrier gas passing through line 1.

In lieu of the flue gas, any substantially dry inert gas can be used, as will be evident to one skilled in the art in possession of this disclosure.

From the bag filter, the catalyst is moved by suitable means, such as the screw conveyor shown to a motor operated star valve which feeds the catalyst via conduits 4 and 5 into the catalyst slurry mix tank 6. The system from the bag filter to the star valve is maintained under a gas positive pressure to prevent the entrance of air and water vapor. Only one mix tank is illustrated but obviously the bag filter can serve a plurality of mix tanks. Thus, one tank can be mixing or preparing a slurry while another is supplying slurry earlier prepared, etc. The mix tank 6 has previously been filled to the desired level with the polymerization solvent and the agitator is in operation in order to maintain the catalyst in suspension. Approximately 330 pounds of catalyst and 16,200 pounds of polymerization solvent, cyclohexane, are added to the mix tank for a 24-hour supply of catalyst slurry. Other suitable solvents can also be used.

After a batch of catalyst has been charged to the mix tank, the valve in conduit 4 is closed and the valve in conduit 10 is open. Additional solvent is heated in exchanger 8 and is introduced as a liquid and/or a vapor via conduit 7 and sparger 9 into mix tank 6. The temperature of the slurry is raised sufficiently to cause some boiling within the tank, say 190° F. at 3 p.s.i.g., for a period of about 5 to about 30 minutes, in order to drive off any dissolved gases, including any small proportion or trace of oxygen not removed earlier. A preponderant proportion of cyclohexane or other solvent is used during the degassing of the catalyst. Steam coils in the tank are preferably avoided to eliminate the possibility of a water leak. Heat exchangers used in the system are of such construction that leakage and mixing of water with the organic liquid is avoided. The Tubeflo heat exchanger manufactured by the Griscom-Russell Company is a preferred type of exchanger well suited to the present invention. Dissolved gases and some solvent are removed from the slurry via conduit 10, condensed by exchanger 11, and separated in accumulator 12. The gases can be vented via conduit 13, while the solvent is returned via conduit 14 to a suitable purification system, not shown. The time for heating the slurry is not critical but is, in any event, sufficient to drive off the non-condensible gases, and will be generally in the range of 5 minutes to one hour, or longer.

After suitable degassing of the slurry, the valve in line 10 is closed and the flow of solvent in conduit 7 is stopped. The slurry is then cooled to ambient temperature by circulation through conduits 16, 17, and 19, and heat exchanger 18. Nitrogen gas under pressure is bled into tank 6 so that a slight positive pressure is maintained. After cooling, the catalyst slurry is circulated through the loop comprising conduits 16, 20, and 19 at such a rate that the flow is turbulent and the catalyst is maintained in suspension in the piping. The slurry is circulated at a rate of about 75 g.p.m. and a small side stream of about 1.7 g.p.m. is taken from the loop by the positive displacement pump 21 and fed at a higher pressure via conduit 22 to the reaction zone, or polymerization chamber, not shown. The circulation pipe here described has an internal diameter in the approximate range 4 to 8 inches. Additional solvent can be and in this example is added to the reaction zone. The effluent from the polymerization chamber contains from about 0.2 to about 0.4 percent catalyst. About 60 percent of the ethylene fed to the polymerization reactor comes out in the effluent in the form of desired polymer.

The preferred range of slurry concentration is about 2 to 4 weight percent catalyst in the polymerization solvent. However, concentrations varying from 1 to 16 percent catalyst in the polymerization solvent can be used.

Referring now to Figure 2, the flow diagram is that of Figure 1, but modified to provide for continuous feeding of the catalyst slurry. Corresponding parts of Figures 1 and 2 are correspondingly numbered. It will be noted that Figure 2 differs from Figure 1 in the provision of vessel 24 to which the catalyst slurry, which has been prepared in vessel 6 and conditioned by circulation through lines 16, 17 and/or 20 and 19 and, of course, vessel 6, is pumped. The catalyst slurry in vessel 24 is withdrawn by pump 26 and pumped by line 27 and line 28 back to vessel 24. The suspension in lines 27 and 28 is, of course, turbulent and, therefore, no undesirable setting can occur. A bleed stream of suspension is taken from pipe 27 by pipe 29 and pumped by way of 21 and pipe 22 to a reactor not shown. The operation of vessel 6 is substantially as described in connection with mix tank 6 of Figure 1. Lines 23 and 34 equipped with system pressure actuated release valves, as shown, are provided for maintaining a desired back pressure on vessels 6 and 24 and their related piping and pumps. Catalyst which is treated in batches in mix tank or vessel 6 is pumped at the end of each of the treatments into vessel 24 from which it is fed continuously to one or more reactors by pump 21 and pipe 22. Thus, it will be noted that this system permits close control of the several variables involved in the preparation of the catalyst slurry to obtain a completely degassed and thoroughly admixed suspension suitable for use in the polymerization reactor, not shown, for the preparation of the polyethylene product. Conduit 32 and its valve provide a pressure release for tank 6 and its associated equipment. Conduit 33 and its valve provide a pressure release for vessel 24 and its associated equipment.

Referring now to Figure 3, fresh or regenerated catalyst is fed by way of conduit 50 to catalyst hopper 51 from which it is fed by means of a star valve into fluidized catalyst chamber 53. Fluidizing gas is fed by way of pipe 54 into the lower portion of chamber 53. The fluidizing gas, as before described, is an inert gas in the sense that it has practically no adverse effect upon the catalyst. The fluidized catalyst is conveyed through conduit 55 into perforated conduit 56, located in solvent introduction vessel 57. Solvent which is introduced by way of pipe 58 is passed by way of pipe 59 into vessel 57 under a pressure sufficient to cause the solvent to pass through perforated pipe 56 into admixture with the fluidized catalyst therein. The perforations of pipe 56, which can be variously designed, are adapted so as to cause turbulence of the solvent which is being admixed with the fluidized catalyst. This turbulence results in complete and thorough admixture. The final admixture obtained in vessel 57 is passed by way of pipe 58a, orifice plate 59a (which can be substituted by equivalent means such as a motor valve) into flash tank 60. A heater 61 is provided to adjust the temperature of the admixture as it leaves vessel 57 or before it enters flash tank 60. In flash tank 60, temperature and pressure conditions are adjusted to be such that the inert gas is flashed from the slurry of catalyst and solvent. Flash tank 60 can be provided with agitator means 62 and/or with baffles 63, or equivalent means, for causing more rapid disengagement of the gas from the slurry. The fluidizing gas together with some solvent vapor and possibly some catalyst fines passes by way of pipe 64, compressor 65 into cyclone 66. In cyclone 66, any catalyst which is separated is recovered and passed by way of conduit 67 to storage. These catalysts can be returned to the flash tank. Vapors and gases pass by way of pipe 68, condenser 69 and pipe 70 into solvent separator 71 from which solvent which is separated there is returned by way of pipe 59 for reuse, as desired. Inert fluidizing gas is removed by way of conduit 72 and, following purification in purification zone 73, is passed by way of pipes 74 and 75 to the suction of pump 76. The gas together with gases withdrawn from the top of chamber 53 is passed by way of conduit 77 to conduit 54 for reuse as already described. It will be noted that the separation of catalyst fines in flash tank 60 can be relied upon advantageously to remove from the catalyst any undesirable fines, thus enhancing the ease of separation of catalyst from the product later obtained therewith. By suitably adjusting the pressure, temperature and time, as well as the degree of agitation in flash tank 60, the catalyst remaining in the slurry can be sized to eliminate fines. Other advantages of the modus operandi described to this point will be apparent to those skilled in the art in possession of this disclosure. The catalyst slurry after a suitable residence time in flash tank 60 is now devoid of undesired gas therein. Also, any residual contaminating or poison gases have been removed therefrom. A slurry is passed by way of conduit 80 which can be provided with temperature adjusting coil 81 into circulating slurry circuit 82 equipped with pump 83. One or more withdrawal lines 84 are provided to supply slurry to one or more reactors, as desired.

It will be evident to one skilled in the art in possession of this disclosure that some variation and modification are possible with respect to each of the figures, which have been described. Also, other modus operandi embodying the basic principles or functions which are set out in the combinations of the figures can be constructed by one skilled in the art in possession of this disclosure.

In the foregoing description, substitutions of various olefins, or mixtures thereof, catalysts or mixtures thereof, solvents or mixtures thereof, and/or of conditions, etc. can be made. Thus, it has been discovered that unique and valuable polymers can be produced by polymerizing an olefin in the presence of a catalyst comprising chromium oxide associated with at least one additional oxide selected from the group consisting of silica, alumina, zirconia, and thoria. At least part of the chromium is preferably in the hexavalent state. The polymerization can be conducted at a temperature in the range 150° to 450° F., although these temperatures are not absolute limits. The feed olefin is preferably selected from the group consisting of aliphatic and cycloaliphatic olefins. Preferably it is an aliphatic 1-olefin. This includes both diolefins and monoolefins. When a monoolefin is used, it is preferred that it have a maximum chain length of 8 carbon atoms and no branching nearer the double bond than the 4-position. Suitable olefins are ethylene, propylene, 1-butene, 1-pentene, 1-hexene, 4-methyl-1-pentene, 1,3-butadiene, and isoprene. Copolymers of any possible combination of individual olefins, as defined, can be prepared. A diluent selected from the group consisting of paraffins and cycloparaffins which are liquid and inert under the polymerization conditions can be used in admixture with the feed olefin. Suitable diluents are propane, isopentane, n-hexane, 2,2,4-tri-methylpentane, cyclopentane, methylcyclopentane, cyclohexane, and methylcyclohexane. The polymerization can be conducted in the gaseous, the liquid, or mixed phase. The pressure can range from atmospheric to as high as 1000 p.s.i., but is ordinarily of the order of 500 p.s.i. A contact time in the range 15 minutes to 20 hours can be used. The catalyst can be prepared by depositing a chromium compound ignitable to an oxide upon one or a mixture or composite of the mentioned non-chromium components. Preferably the catalyst is activated by heating, for example, at 750 to 1500° F. for from several minutes to 20 or more hours in a nonreducing atmosphere such as dry air. The total chromium content of the catalyst can be, for example, in the range 0.1 to 50 weight percent, usually from 1 to 10 weight percent. The hexavalent chromium content is preferably at least 0.1 weight percent. This type of process is described in more detail in copending application Serial No. 573,877, filed March 26, 1956, now U.S. Patent No. 2,825,721.

Reasonable variation and modification are possible within the scope of the foregoing disclosure, the drawings, and the appended claims to the invention, the essence of which is that a method for preparing and feeding, either batch-wise or continuously, a catalyst slurry to a reaction zone, especially one in which a polyolefin product is being prepared, has been set forth, as described herein, the said method comprising preparing and circulating at high rates through a circulating loop or system a catalyst slurry from which a small side stream is taken at pressures which are relatively low, and moved, preferably by means of a positive displacement pump, to the relatively higher pressure of the reaction zone and more specifically a method wherein the catalyst is transported with a dry inert gas to a slurry mixing tank feeding zone wherein the inert gas is substantially separated from the catalyst, allowing the catalyst particles to agglomerate, the catalyst particles are then fed to a slurry mixing tank therein admixed with a solvent, the slurry tank contents being heated or circulated and heated to cause further degasification of the same and, finally, the slurry thus prepared circulated at said high rates through said circulating loop, from which it is conveyed to a reaction zone at substantially higher pressure; in one alternative the said slurry being pumped to another vessel periodically as prepared, the said another vessel being provided with a circulating system of its own providing for rapid circulation in a circulating loop from which then the catalyst slurry is pumped to the said reaction zone, at said substantially higher pressure, as desired and as described herein; and in another alternative the catalyst fluidized with an inert gas is passed through a perforated pipe located in a solvent admixing vessel to provide turbulent admixture of the solvent and fluidized catalyst, following which the gases are flashed from the catalyst slurry thus obtained which slurry is then fed to a circulating loop, also as described herein.

We claim:

1. A method of converting an olefinic material to a polymer in the presence of a catalytic slurry which comprises activating a catalyst adapted to the conversion of said olefinic material under conditions excluding undesirable contamination, transporting said catalyst in a transport gas under conditions to displace air and water vapor from said catalyst to a slurry preparation zone, in said zone admixing said catalyst with a fluid adapted to prepare said slurry, in said zone degassing the slurry obtained therein, circulating said slurry from said zone and back to said zone through a closed circuit in which the slurry is maintained in a state of turbulence sufficient to avoid segregation of said slurry, removing a small portion of the slurry being circulated from said circuit, introducing said portion of slurry into a conversion zone maintained under polymer-forming conditions, and therein contacting said slurry with said olefinic material to form said polymer.

2. A method according to claim 1 in which the olefinic material is selected from the group consisting of aliphatic and cycloaliphatic olefins, the catalyst comprises chromium oxide associated with at least one additional oxide selected from the group consisting of silica, alumina, zirconia, and thoria, in which at least part of the chromium is in the hexavalent state, the polymerization is conducted at a temperature in the range 150–450° F. and the hydrocarbon solvent is selected from the group consisting of paraffins and cycloparaffins.

3. A method of converting an olefinic material to a polymer in the presence of a catalytic slurry which comprises activating a catalyst adapted to the conversion of said olefinic material under conditions excluding undesirable contamination, transporting said catalyst in a transport gas which is inert with respect to said catalyst under conditions to displace air and water vapor from said catalyst to a zone adapted to separate said gas substantially from said catalyst and to accumulate a body of catalyst therein, in said zone separating gas from said catalyst and accumulating a body of catalyst, feeding catalyst from said accumulated body thereof to a slurry preparation zone, in said zone admixing said catalyst with a hydrocarbon solvent which is liquid and which does not adversely affect the conversion effectuated therein, in said zone degassing completely the said slurry by heating and agitating the same, circulating said slurry from said zone and back to said zone through a closed circuit in which the slurry is maintained in a state of turbulence sufficient to avoid segregation separation of said slurry, removing a small proportion of the slurry being circulated from said circuit, introducing said portion of the slurry into a conversion zone maintained under polymer-forming conditions, and therein contacting said slurry with said olefinic material to form said polymer.

4. A method according to claim 3 wherein the olefinic material consists essentially of ethylene.

5. A method according to claim 3 wherein the olefinic material consists essentially of propylene.

6. A method of converting an olefinic material to a polymer in the presence of a catalytic slurry adapted to the conversion which comprises in an admixing zone admixing catalyst with a fluid adapted to form said slurry, circulating a slurry thus obtained from and to said zone, heating said slurry while it is being thus circulated, while circulating and mixing said slurry removing gaseous and vaporous materials therefrom, transferring catalyst from the circulating mass of catalyst to a storage zone periodically as masses of said catalyst have been prepared as described herein, in said storage zone maintaining a body of catalyst slurry, circulating a portion of said body of catalyst slurry under turbulent conditions sufficient to avoid segregation separation of the slurry in a closed circuit from said storage zone to said storage zone and continuously removing from said circuit a small proportion of catalyst slurry and feeding said catalyst slurry to a conversion zone and therein contacting said slurry with said olefinic material to convert the same.

7. A method adapted to the feeding of a sub-divided catalyst to an olefinic conversion zone which comprises transporting said catalyst in activated state with a dry gas which does not adversely affect the activity of said catalyst, separating said gas and catalyst in a filter zone, maintained under a positive pressure of said gas, removing gas from said zone, removing catalyst substantially but not completely free of said gas from said zone, and while maintained under a positive pressure of said gas, conveying said catalyst to a slurry-preparing zone, in said slurry-preparing zone admixing said catalyst with a liquid diluent adapted to form a slurry and which does not adversely affect the activity of said catalyst, degassing a slurry thus obtained in said slurry-preparing zone, thus removing substantially completely all gas which is released from said slurry under the conditions of the mixing resulting in its preparation, circulating slurry thus obtained in a closed circuit from and to said slurry-preparing zone under turbulence sufficient to prevent segregation separation of said slurry, heating said slurry while it is being circulated to a temperature and for a period of time sufficient to drive off therefrom any dissolved gases remaining therein to insure removal of any small remaining proportion of oxygen, then while the slurry is being circulated in said circuit, pumping a portion of said slurry, thus prepared, directly without any further treatment of any kind to an olefinic conversion zone which is operated under conditions including a pressure substantially higher than that prevailing in said circuit.

8. A method adapted to the feeding of a sub-divided catalyst which is adapted to the polymerization of olefins to an olefin-conversion zone which comprises transporting said catalyst in activated state with a dry gas which does not adversely affect the activity of said catalyst, separating said gas and catalyst in a filter zone, maintained under a positive pressure of said gas, removing gas from said zone, removing catalyst substantially but not completely free of said gas from said zone and while maintained under a positive pressure of said gas, conveying said catalyst to a slurry-preparing zone, in said slurry-preparing zone admixing said catalyst with a hydrocarbon liquid diluent adapted to form a slurry and which does not adversely affect the activity of said catalyst, degassing a slurry obtained in said slurry-preparing zone, thus removing substantially completely all gas which is released from said slurry under the conditions of the mixing resulting in its preparation, circulating slurry thus obtained in a closed circuit from and to said slurry-preparing zone under turbulence sufficient to prevent segregation separation of said slurry, heating said slurry while it is being circulated to a temperature of the order of 190° F. and for a period of time sufficient to drive off therefrom any dissolved gases remaining therein to insure removal of any small remaining proportion of oxygen, bleeding into said slurry-preparing zone a sufficient quantity of a gas which does not adversely affect the activity of said catalyst to maintain said zone under a positive pressure, then while the slurry is being circulated in said circuit, pumping a portion of the slurry, thus prepared, directly without any further treatment of any kind, to an olefin polymerization zone which is operated under conditions including a pressure substantially higher than that prevailing in said circuit.

9. A method according to claim 8 wherein the olefin is selected from the group consisting of aliphatic and cycloaliphatic olefins, the catalyst is one which comprises chromium oxide associated with at least one additional oxide selected from the group consisting of silica, alumina, zirconia, and thoria, the polymerization in said polymerization zone is in the approximate range 150 to 450° F., the hydrocarbon liquid diluent is selected from the group consisting of paraffins and cycloparaffins, and the pressure is of the order of 500 pounds per square inch.

10. A method adapted to the feeding of a sub-divided catalyst to an olefinic conversion zone which comprises transporting said catalyst in activated state with a dry gas which does not adversely affect the activity of said catalyst, separating said gas and catalyst in a filter zone, maintained under a positive pressure of said gas, removing gas from said zone, removing catalyst substantially but not completely free of said gas from said zone and while maintained under a positive pressure of said gas, conveying said catalyst to a slurry-preparing zone, in said slurry-preparing zone admixing said catalyst with a liquid diluent adapted to form a slurry and which does not adversely affect the activity of said catalyst, degassing a slurry thus obtained in said slurry-preparing zone, thus removing substantially completely all gas which is releaaed from said slurry under the conditions of the mixing resulting in its preparation, circulating slurry thus obtained in a closed circuit from and to said slurry-preparing zone under turbulence sufficient to prevent segregation separation of said slurry, heating said slurry while it is being circulated to a temperature and for a period of time sufficient to drive off therefrom any dissolved gases remaining therein to insure removal of any small remaining proportion of oxygen, then while the slurry is being circulated in said circuit, pumping a portion of the slurry, thus prepared, directly, without any further treatment of any kind, to a catalyst slurry storage zone, circulating catalyst from said catalyst storage zone in a closed circuit from and to said zone, under conditions of turbulence sufficient to prevent segregation separation of catalyst in said last mentioned circuit and removing a portion of catalyst slurry from said circuit and pumping it to an olefin-conversion zone which is operated under conditions including a pressure substantially higher than that prevailing in said last-mentioned circuit.

11. An apparatus for supplying a catalyst slurry to a reaction zone operated substantially above atmospheric pressure which comprises in combination means for receiving a mixture of catalyst and transport gas and for separating substantially said gas from said catalyst and accumulating said catalyst in said means, means for moving said catalyst to a mixing vessel, means upon said mixing vessel for introducing a slurry preparing medium thereinto, means upon said vessel comprising a conduit for removing contents of said vessel and for returning contents of said vessel in a closed circuit, means for removing and returning catalyst in a circuit adapted to circulate catalyst through said means providing said circuit in turbulent flow, means associated with said circuit to heat slurry circulated therethrough, means associated with said mixing vessel for removing vaporous materials from slurry therein, means associated with said circuit to remove catalyst therefrom, said means for removal of catalyst being adapted to convey said catalyst, in the form of slurry, to a zone of higher pressure than that which prevails in said circuit.

12. An apparatus according to claim 11 wherein there is provided an additional vessel in which catalyst removed from said circuit can be accumulated and wherein there is associated with said vessel means for circulating in a closed circuit catalyst withdrawn from said additional vessel and returned thereto and means for withdrawing a portion of catalyst being circulated from and to said additional vessel and for conveying the same as a slurry to a zone of still higher pressure.

13. An apparatus according to claim 12 wherein said additional vessel is provided with means for degassing catalyst slurry accumulated therein.

14. A method of converting an olefinic material to a polymer in the presence of a slurry of a solid sub-divided catalyst which has been treated with dry air to dehydrate the same and which, therefore, contains oxygen and which catalyst is adapted to the conversion of said olefinic material under conditions excluding undesirable contamination, which comprises activating such a catalyst, treating said catalyst with dry air, transporting and handling said catalyst in an inert transport gas under conditions to displace air from said catalyst, feeding said catalyst to a slurry preparation zone, in said zone admixing said catalyst with a liquid adapted to prepare said slurry, degassing the slurry so obtained in said zone, circulating said slurry through a closed circuit in said zone in which the slurry is maintained in a state of turbulence to avoid segregation of said slurry, removing a portion of the slurry being circulated from said circuit and forcing said portion of slurry into a conversion zone maintained at a higher pressure than that prevailing in said closed circuit and under polymer-forming conditions, and in said conversion zone, contacting said slurry with said olefinic material to form said polymer.

15. A method for supplying a catalyst to a reaction zone in sub-divided form and as a slurry wherein the slurry is formed by fluidizing catalyst with a fluidizing gas, then admixing solvent with the fluidized catalyst and then flashing the gas from the slurry thus obtained, wherein the fluidized catalyst is admixed with said solvent by passing the fluidized catalyst through a perforated pipe, forcing solvent into said fluidized catalyst in said pipe, and therein admixing said catalyst and solvent under turbulent conditions, thus obtaining the fluidizing gas together with any traces of undesired gases earlier still in said catalyst as a mixture of gases which can be removed in said flashing and wherein the slurry, when prepared, is maintained as such as a body of uniform concentration which is continuously maintained turbulent throughout its entire mass and which is circulated in a circulating system under turbulent conditions to avoid segregation separation thereof, and wherein a small portion of the slurry thus circulated is removed and supplied to said reaction zone.

References Cited in the file of this patent

UNITED STATES PATENTS

| | | |
|---|---|---|
| 2,521,940 | Oriolo | Sept. 12, 1950 |
| 2,608,392 | Bowman | Aug. 26, 1952 |
| 2,667,521 | Harney | Jan. 26, 1954 |
| 2,689,209 | Blair | Sept. 14, 1954 |
| 2,691,647 | Field et al. | Oct. 12, 1954 |
| 2,755,324 | Mueller | July 17, 1956 |
| 2,825,721 | Hogan et al. | Mar. 4, 1958 |

FOREIGN PATENTS

| | | |
|---|---|---|
| 554,085 | Great Britain | June 18, 1953 |
| 530,617 | Belgium | Jan. 24, 1955 |